(12) United States Patent
Marchetti

(10) Patent No.: US 9,828,180 B2
(45) Date of Patent: Nov. 28, 2017

(54) FABRIC CONVEYOR BELT WITH LAYERED PVC AND POLYESTER COATING AND METHOD OF FORMING THE SAME

(71) Applicant: Uniband USA, LLC, Grand Rapids, MI (US)

(72) Inventor: Franco Milco Marchetti, Ada, MI (US)

(73) Assignee: UniBand USA, LLC, Grand Rapids, MI (US)

( * ) Notice: Subject to any disclaimer, the term of this patent is extended or adjusted under 35 U.S.C. 154(b) by 0 days.

(21) Appl. No.: 15/097,768

(22) Filed: Apr. 13, 2016

(65) Prior Publication Data

US 2016/0325935 A1 Nov. 10, 2016

Related U.S. Application Data

(60) Provisional application No. 62/156,634, filed on May 4, 2015.

(51) Int. Cl.
| | |
|---|---|
| *B65G 15/34* | (2006.01) |
| *B05D 3/00* | (2006.01) |
| *B29D 29/06* | (2006.01) |

(52) U.S. Cl.
CPC ............ *B65G 15/34* (2013.01); *B05D 3/002* (2013.01); *B29D 29/06* (2013.01); *B05D 2201/02* (2013.01)

(58) Field of Classification Search
CPC ....................................................... B65G 15/34
USPC ........................................................ 198/847
See application file for complete search history.

(56) References Cited

U.S. PATENT DOCUMENTS

| 3,032,816 A | * | 5/1962 | Zimmerli .................. B05D 1/24 |
| | | | 118/119 |
| 3,433,700 A | * | 3/1969 | Biskup ......................... C08J 9/04 |
| | | | 156/79 |
| 5,316,132 A | | 5/1994 | Muraoka et al. |

OTHER PUBLICATIONS

DuPont, "DuPont Product Information on DuPont Htyrel 4056P Thermoplastic Polyester Elastomer", Aug. 12, 2014.
Continental Contitech, "Installing and Splicing Textile Conveyor Belts", 2010 Conveyor Belt Group, pp. 1-28.
Flexco, "Novitool Pun M Mobile Finger Punch", 2014 Flexible Steel Lacing Company.
Flexco, "Get the Facts About Conveyor Belt Splicing Techniques", 2010 Flexible Steel Lacing Company.

(Continued)

*Primary Examiner* — Leslie A Nicholson, III
*Assistant Examiner* — Lester Rushin
(74) *Attorney, Agent, or Firm* — Gardner, Linn, Burkhart & Flory, LLP

(57) ABSTRACT

A fabric carcass defines the base of a conveyor belt. A first polymer is coated or otherwise disposed over an exterior side of the fabric carcass to cure with a first layer thickness. The first polymer may be a polyvinyl chloride resin with a plasticizer additive to provide an added robustness to belt at a relatively low cost. Due to deterioration that may occur when certain polyvinyl chloride resins are used as the exterior surface of the conveyor belt, a second polymer is disposed over the cured layer of polyvinyl chloride to define an exterior surface that is configured for resiliently interfacing with a die press of a cutting or stamping station. The second polymer may be a polyester to provide improved resiliency and an exterior surface with better durability than the first polymer.

20 Claims, 9 Drawing Sheets

(56) References Cited

OTHER PUBLICATIONS

Flexco, "Belt Splicing Solutions for Food Processing Operations", 2013.
Flexco, "Technical Solutions for Belt conveyor Productivity", Insights, 2014 Flexible Steel Lacing Company.
Wikipedia, "Polyvinyl Chloride", Jul. 7, 2016, found at https://en.wikipedia.org/wiki/Polyvinyl_chloride.

* cited by examiner

FABRIC CONVEYOR BELT WITH LAYERED PVC AND POLYESTER COATING AND METHOD OF FORMING THE SAME

CROSS REFERENCE TO RELATED APPLICATION

The present application claims the benefit of U.S. provisional application Ser. No. 62/156,634, filed May 4, 2015, which is hereby incorporated herein by reference in its entirety.

FIELD OF THE INVENTION

The present invention generally relates to a conveyor belt construction and an associated forming method of the belting, and more particularly to a fabric conveyor belt that is coated with polymer or other compositions that may be adapted for carrying heavy rigid objects or interfacing with a die press of a cutting or stamping station.

BACKGROUND OF THE INVENTION

It is generally known to use woven textiles that are treated with polymer or other thermoplastic material for conveyor belting to increase the ability of the belt to withstand longitudinal tensile stresses and generally maintain transverse stability. Such a polymer coating can be applied to the fiber strands of belt before weaving the fabric or applied directly to the woven fabric to increase the stability of the belting. Common methods to treat woven fabric include laminating methods, polymer extrusion methods, and cured liquid treatment methods. However, treating fabric used in conveyor systems presents challenges, in that the polymer of a treated belt may experience cracking and other failure when placed under tension and when the belt is bent around rollers of a conveyor system. In addition to these general operating conditions of a conveyor system, conveyor belting that is adapted for carrying heavy rigid objects or interfacing with a die press of a cutting or stamping station undergoes significant compressive forces usually perpendicular to the planar extent of the belting. Accordingly, there are significant challenges in forming a conveyor belt that uses economical materials and forming processes that can also durably perform in such an operating environment.

SUMMARY OF THE INVENTION

The present invention provides a conveyor belt that may be configured to be used conveying objects, such as sharp and rigid material being recycled, or in a continuous cutting or stamping station that applies compressive forces perpendicular to the planar extent of the belt. The conveyor belt includes a fabric carcass that continuously supports and defines the base of the conveyor belt. The fabric carcass may be made of up of a woven structure of filaments, with at least some of the filaments arranged longitudinally in a conveyance direction to withstand tensile stresses put on the conveyor belt. A first polymer is coated or otherwise disposed over an exterior side of the fabric carcass to cure with a first layer thickness. The first polymer may be a polyvinyl chloride resin with a plasticizer additive to provide an added robustness to belt at a relatively low cost. Due to discovered deterioration that may occur when certain polyvinyl chloride resins are used as the exterior surface of the belt, a second polymer is disposed over the cured layer of polyvinyl chloride to define an exterior surface that is configured for resiliently interfacing with the die press of a cutting or stamping station. The second polymer may be a polyester to provide improved resiliency and an exterior surface with better durability for conveyor systems than the first polymer.

According to one aspect of the present invention, a conveyor belt is provided with a fabric carcass having woven filaments in longitudinal and lateral directions, such that the fabric carcass is configured to convey objects in the longitudinal direction. A reinforcing polymer that includes polyvinyl chloride is disposed in a first defined layer over an exterior side of the fabric carcass to form a first thickness. An exterior polymer that includes polyester is disposed in a second defined layer over the first defined layer to fused therewith and form a second thickness. The exterior polymer provides greater compressive resiliency than the reinforcing polymer.

According to another aspect of the present invention, a conveyor belt for interfacing with a die press includes a fabric carcass having filaments disposed longitudinally in a conveyance direction. A polyvinyl chloride resin is impregnated in the fabric carcass and is disposed over an exterior side of the fabric carcass to cure with a first layer thickness. A polyester resin is disposed over the cured layer of polyvinyl chloride resin to form a second layer thickness and define an exterior surface that is configured for resiliently interfacing with the die press that compresses and bites down into the polyester substrate.

According to another aspect of the present invention, a method for forming a conveyor belt includes providing a fabric belt carcass and impregnating the fabric belt carcass with a polyvinyl chloride resin. A reinforcing polymer comprising polyvinyl chloride is applied over an exterior side of the fabric belt carcass. An exterior polymer comprising polyester is applied over the reinforcing polymer to define an exterior surface of the conveyor belt.

According to another aspect of the present invention, a method for forming a conveyor belt includes providing a fabric carcass having filaments woven in a longitudinal direction. The fabric carcass is placed under generally constant tension in the longitudinal direction. The fabric carcass is impregnated with a liquid polyvinyl chloride resin to form a substantially impervious belt. A first polymer resin comprising polyvinyl chloride is applied over an exterior side of the fabric carcass to define a first layer. The first polymer resin is leveled with a doctor blade to regulate a first gauge thickness of the first layer and to define an outer surface thereof. A second polymer resin comprising polyester is applied over the outer surface of the first layer to define a second layer. The second layer is leveled with a doctor blade to regulate a second gauge thickness of the second layer and to define an exterior surface of the conveyor belt.

These and other objects, advantages, purposes, and features of the present invention will become apparent upon review of the following specification in conjunction with the drawings.

DESCRIPTION OF THE PREFERRED EMBODIMENTS

Figure 1:
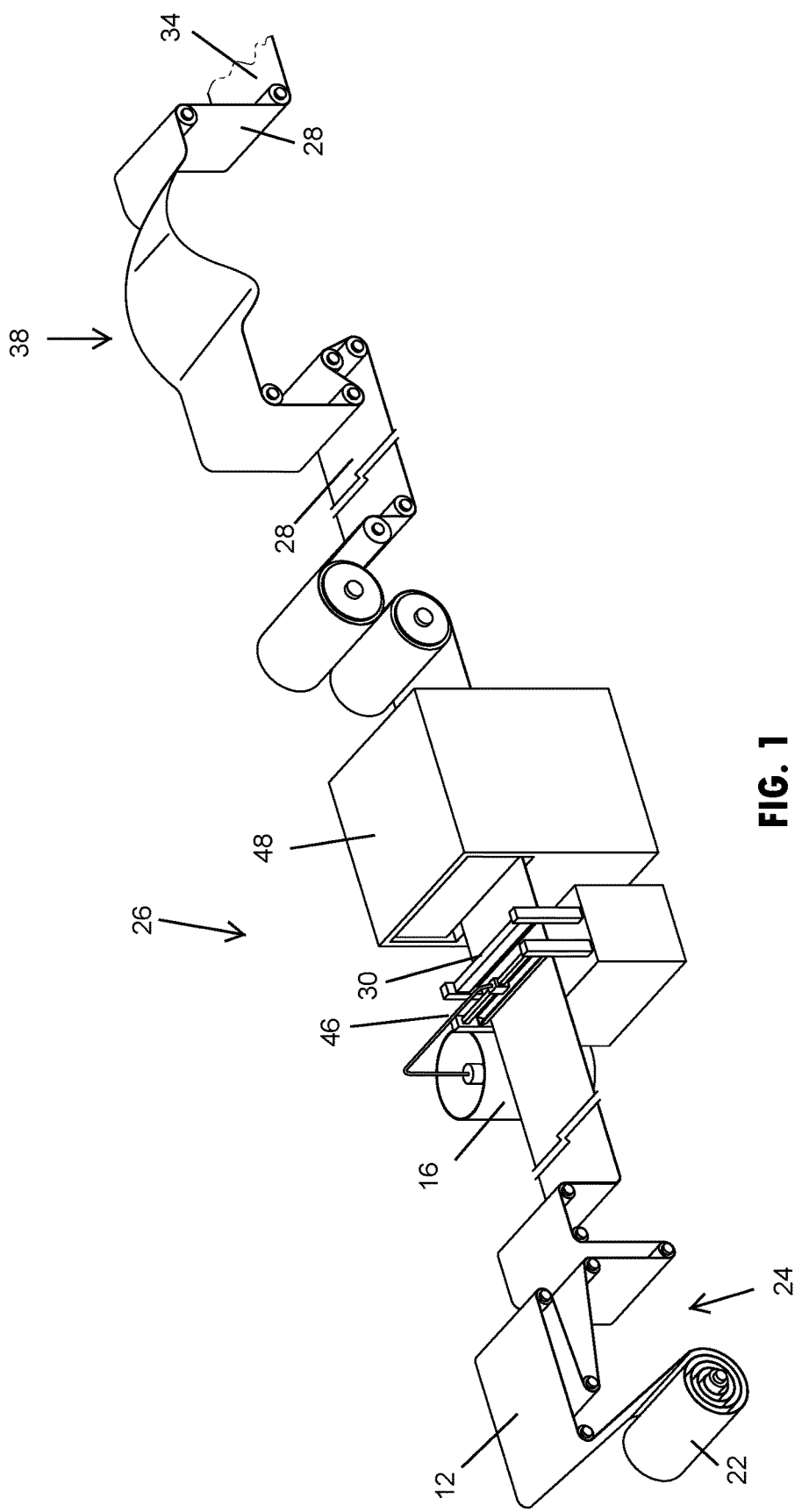
FIG. 1 is a perspective schematic illustration of a first station of a process used to form a conveyor belt, in accordance with one embodiment the present invention.

Referring now to the drawings and the illustrative embodiments depicted therein, a conveyor belt 10 in accordance with the present invention is shown with a belt carcass 12 that continuously supports and defines the base of the conveyor belt 10. The belt carcass 12 may be made of up of a fabric structure of filaments 14, with at least some of the filaments arranged longitudinally in a conveyance direction CD to withstand tensile stresses put on the conveyor belt 10. A first polymer 16 is impregnated in the belt carcass 12 and is disposed as a layer over an exterior side of the belt carcass 12 to cure with a define thickness away from the belt carcass 12. The first polymer 16 may be a polyvinyl chloride resin with a plasticizer additive to provide robustness to the belt at a relatively low cost. Due to discovered deterioration that may occur if the first polymer 16 is used as the exterior surface of the belt, the present invention provides a second finishing polymer 18 over the cured layer of the first polymer 16 to define an exterior surface 20 of the conveyor belt 10. The second polymer 18 may be a polyester resin, such as a polyester elastomer, that is configured to provide improved resiliency and an exterior surface 20 with enhanced durability for conveyor systems, such as for resiliently interfacing with a die press of a cutting or stamping station.

Figure 2:
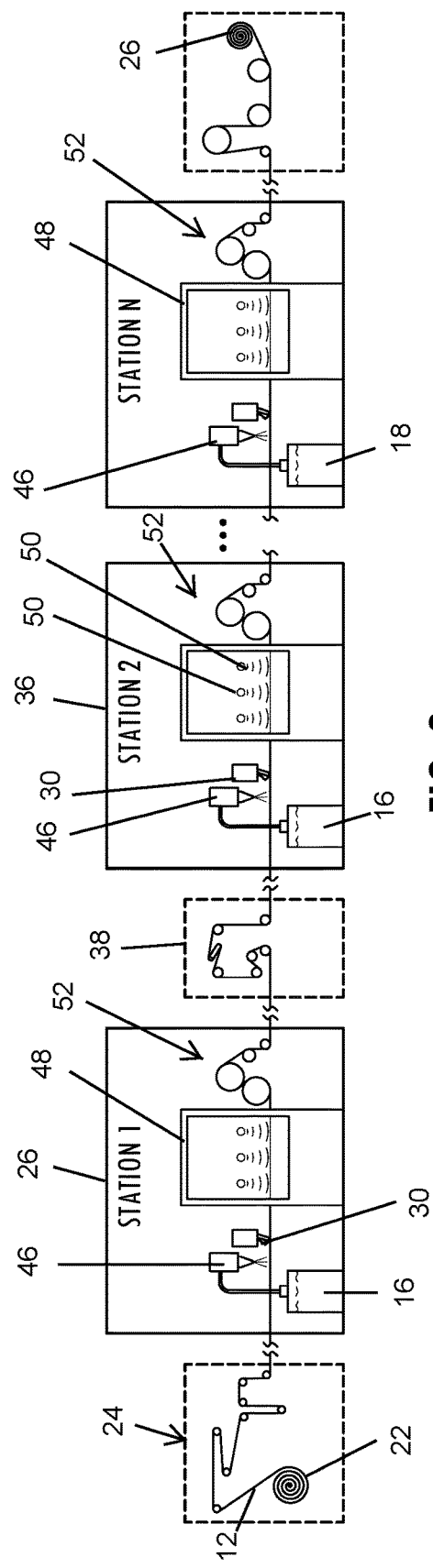
FIG. 2 is a schematic illustration of multiple stations of a process used to form a conveyor belt, in accordance with the present invention.

With reference to the embodiment of the conveyor belt 10 shown in the schematic process diagram depicted in FIGS. 1 and 2, the fabric carcass 12 is provided on a wound spindle 22 that may freely rotate to release the sheet of fabric belting 12. Prior to any resins or treatments being applied to the fabric, the fabric carcass 12 may be placed under tension in the longitudinal direction with a pretension winder 24. The tension applied is carried through the production line, which allows the polymer resins to cure to the fabric belting in tension, thereby reducing initial failure, such as cracking, to the polymer on the conveyor belt when placed under tension in operation of conveyor system. Accordingly, the tension applied with the pretension winder 24 may be similar to the tension applied during the operating conditions of the conveyor system under which the belt is intended to perform.

As also generally shown in FIG. 2, multiple stations may be provided in the production line that are treating the conveyor belt 10 in a continuous operation, thereby having the potential to start the production line with an untreated fabric belt 12 and have a finished conveyor belt 10 at the final roller 26. However, it should be understood that the multiple stations are merely provided for illustration, as a single station could conceivable be adjusted and repeatedly used to provide the same effective treatments to the conveyor belt 10, albeit at a less efficient process. Accordingly, the stations start treating the fabric by first impregnating the belt carcass 12 with a resin comprising the first polymer 16 and applying the first polymer 16 in layer over an exterior side of the fabric belt carcass. A resin comprising the second polymer 18 is then applied in a layer over the resin having the first polymer 16 to define an exterior surface 20 of the conveyor belt. Due to the advantages of applying these resins in multiple layers to achieve a desired thickness, the number of stations used can vary and therefore the final station is depicted as station N to indicate a modifiable number of total stations in accordance with the desired thicknesses, properties of the resin materials be applied, and intended use of the conveyor belt being processed.

Specific to the conveyor belt discussed herein, the first polymer resin 16 includes a thermoplastic resin, such as polyvinyl chloride (PVC), combined with a liquid plasticizer to increase the elasticity of the resin. However, it is contemplated that the first polymer 16 may be one or more other thermoplastic polymers or a thermosetting polymer, such as polyurethane, although for thermosetting polymers a different forming process without heat application may be required. The second polymer resin 18 includes a thermoplastic resin, such as polyester, which may be a thermoplastic elastomer, such as DuPont™ Hytrel®. Further, the fabric carcass may be formed with polyester, polyamide, rayon, cotton, nylon, or any combination thereof. Also, the fabric carcass of the present invention can be any convention weave, but a weave with relatively wide opening is preferred to allow for impregnation with resin. It is also contemplated that the belt carcass of the present invention may be a composite with strands of monofilaments, such as carbon fibers, metals, or any of the fabric materials listed above, extending in the longitudinal direction and interconnected with other conceivable materials. Optionally, the belt carcass may also be a non-woven carcass, such as a polyester or aramid needle felt.

Figure 3:
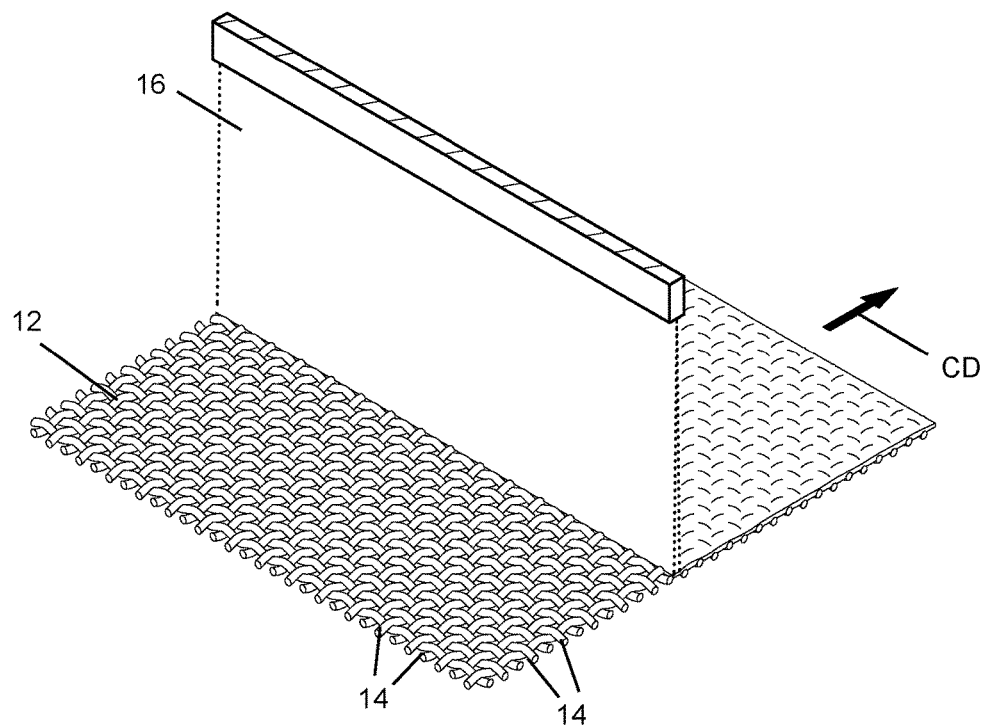
FIG. 3 is a perspective view of a portion of a fabric carcass being impregnated with a polymer resin, according to one embodiment.
Figure 3A:
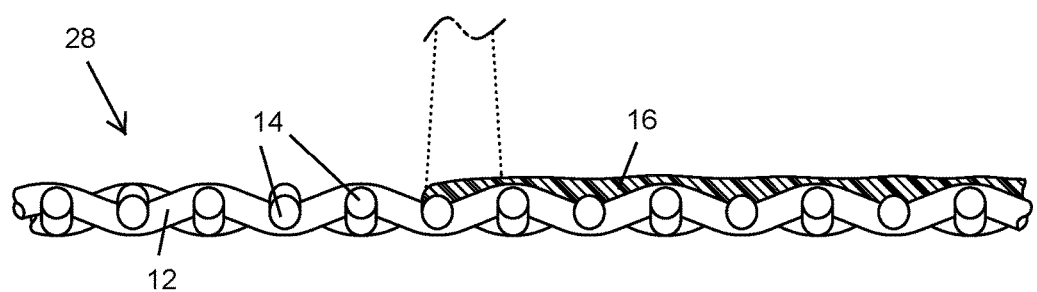
FIG. 3A is a cross-sectional view of the conveyor belt shown in FIG. 3.
Figure 4:
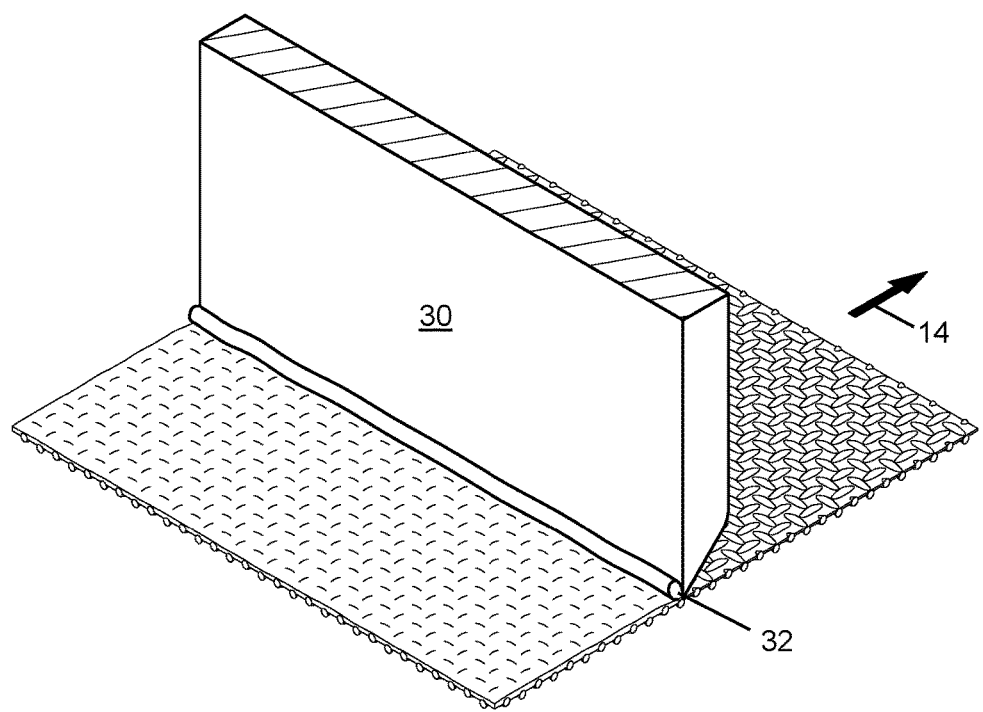
FIG. 4 is a perspective view of a doctor blade scrapping some of the polymer resin from an interior side of the fabric carcass, according to one embodiment.
Figure 4A:
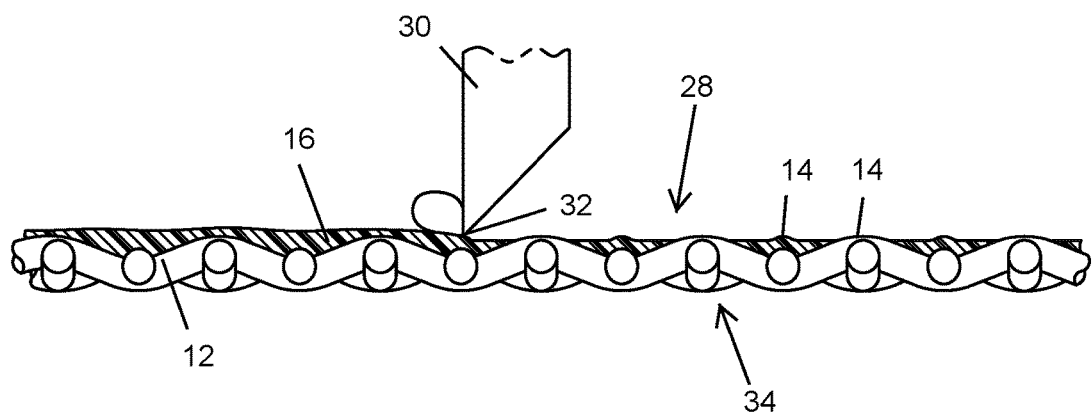
FIG. 4A is a cross-sectional view of the conveyor belt shown in FIG. 4.

At the first station 26, as generally shown in FIGS. 1-4A, the resin comprising the first polymer 16 is in liquid form, having PVC and plasticizer, and is applied substantially uniformly over the upper surface of the belting, which during operation is the interior side 28 or roller side of the fabric belting (FIG. 3A). This application of the first polymer resin 16 at least partially impregnates the fabric carcass 12 with the liquefied resin, as illustrated in FIGS. 3-3A. The impregnation of the fabric carcass 12 includes any resin that is absorbed by the filaments of the fabric or otherwise disposed in the open pores between the filaments 14 of the fabric. As the fabric carcass continues to move through the first station 26, a doctor blade 30 that spans laterally across the entire belt 10 is positioned with a distal edge 32 of the blade in abutting contact with the upper surface or interior side 28 of the fabric belting, thereby shaving a portion of the resin comprising the first polymer 16 off the fabric carcass 12 to expose portions of the woven filaments 14 (FIGS. 4-4A). The shaving of the interior side surface of the fabric carcass 12 may also spread uneven levels of resin and remove discontinuities that might cause the belt to experience lateral movement or generally inconsistent behavior when moving over rollers of a conveyor system. Also, the shaving of the interior surface of the fabric carcass 12 to exposed portions of the woven fabric may provide added friction during use of the final conveyor belt, such as when the interior side 28 of the belt abuts against a powered roller of a conveyor system. More specifically, the distal edge 32 of the doctor blade 30 scraps the excess polymer resin from the uppermost portion the woven threads of the fabric carcass 12, leaving the polymer resin intact that is otherwise impregnated in the fabric carcass. This remaining portion of polymer resin may be substantially adhered and cured to the fabric carcass 12, as discussed in more detail below, and may thereby form a substantially impervious belt. It is also contemplated that the first polymer may be delivered or applied to the fabric carcass or in a layer over an existing polymer on the fabric carcass in other conceivable manners, such as by lamination or extrusion of the PCV in solid form (e.g. pellets).

Figure 5:
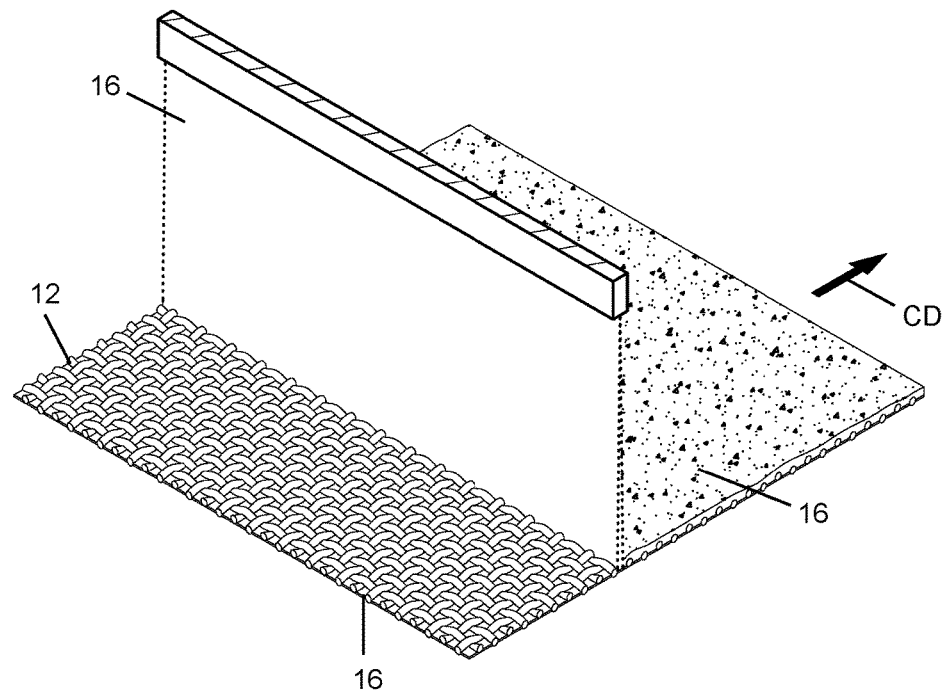
FIG. 5 is a perspective view of the fabric carcass receiving a layer of polymer resin, according to one embodiment.
Figure 5A:
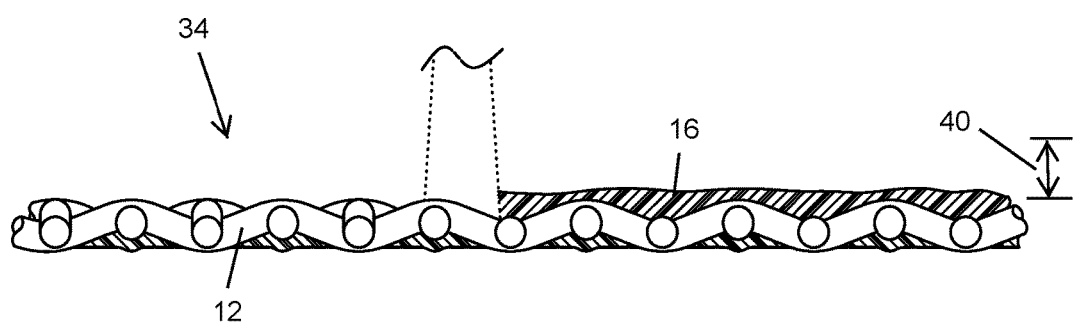
FIG. 5A is a cross-sectional view of the conveyor belt shown in FIG. 5.

After the optional initial impregnation with the resin comprising the first polymer 16, the belt may receive a coating of the resin comprising the first polymer 16 on the exterior side 34 of the fabric carcass, as shown at the second station 36 in FIG. 1 and in FIGS. 5-5A. It is contemplated that a coating of the first polymer resin 16 may be applied to a belt that has not been impregnated or otherwise treated, as the coating of the first polymer resin may be sufficient to provide the intended reinforcement and/or thickness to the belt. To apply the first polymer resin 16 to the exterior side 34, the belt may be flipped in a series of rollers 38 that gradually twist the belt 180° to present the exterior side 34 of the belt substantially horizontally as the uppermost side of the belt. The additional layering of the first polymer resin 16 may provide a reinforcing layer of the PVC and plasticizer additive to increase the robustness, hardness, and overall gauge of the conveyor belt. This reinforcing polymer may be formed in a first defined layer 40 over the exterior side of the fabric carcass to form a thickness elevated away from the uppermost surface of the filaments of the fabric carcass. Specially, for use in conveying recyclable materials that may be sharp, the reinforcing layer of PVC may be beneficial to prevent unwanted damage to the fabric carcass. In some instances, the reinforcing layer may be sufficient or complete with a single impregnation layer of the first polymer resin 16 that is applied to either the interior or exterior side 28, 34 of the fabric carcass, such that the final belt 10 is sufficiently reinforced for its intended use.

Figure 6:
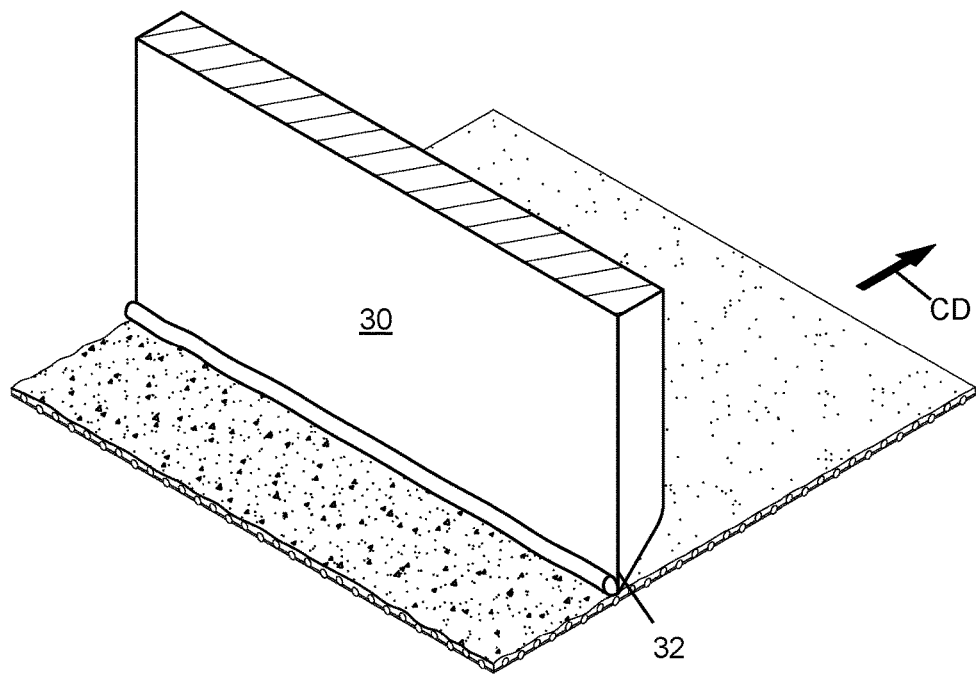
FIG. 6 is a perspective view of a doctor blade leveling the polymer resin on an exterior side of the fabric carcass, according to one embodiment.
Figure 6A:
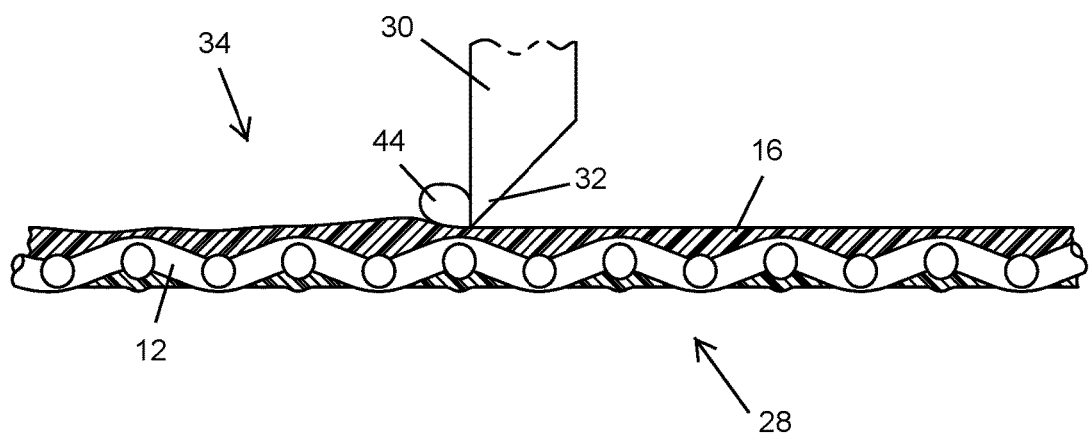
FIG. 6A is a cross-sectional view of the conveyor belt shown in FIG. 6.
Figure 7:
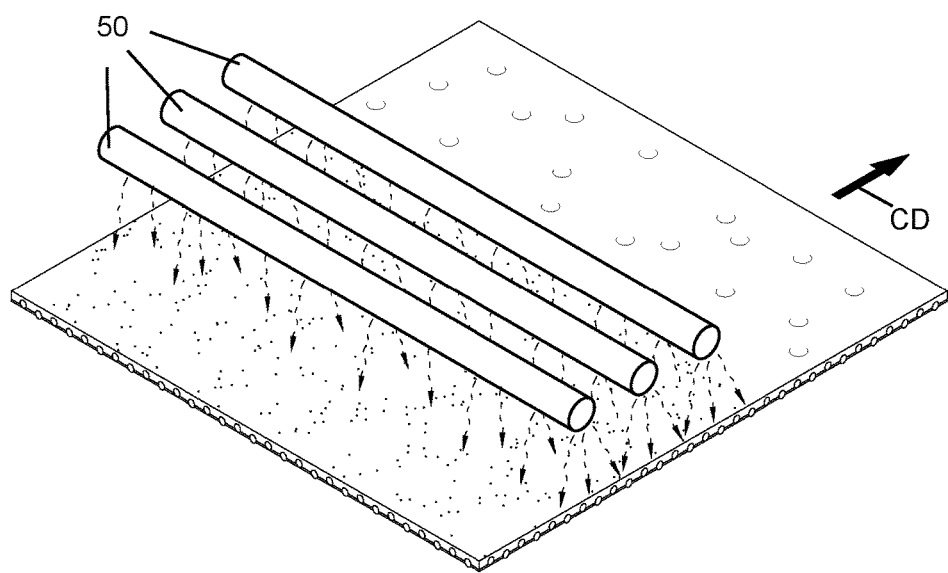
FIG. 7 is a perspective view of an infrared oven heating the polymer resin on an exterior side of the fabric carcass, according to one embodiment.
Figure 7A:
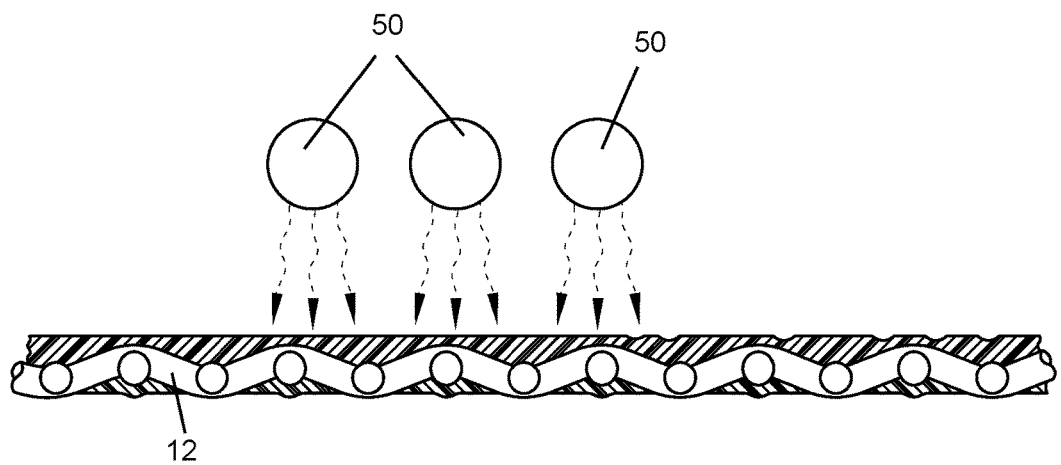
FIG. 7A is a cross-sectional view of the conveyor belt shown in FIG. 7.

Once a reinforcing layer of the first polymer resin 16 is applied to the exterior side 34 of the fabric carcass, as shown in FIGS. 6-6A, it may again be leveled or spread by a doctor blade 30 that has the distal edge 32 elevated from the fabric carcass 12. Accordingly, the doctor blade 30 is used to regulate the gauge thickness 40 of the layer of the first polymer resin 16 and to define a level outer surface 42 thereof. The doctor blade 30 may accumulate a pool 44 of resin on the intake side of the blade as the layer of resin is smoothed and leveled, which may be reduced by occasionally adjusting the flow of resin that is pumped to the distribution head 46 (FIGS. 1-2). After passing through the doctor blade 30, this layer of the first polymer 16 may be again be substantially adhered and cured to the fabric carcass and any other thermoplastic resin it may contact, as explained in greater detail below.

As shown in FIGS. 1-2 and 7-7A, the curing process for a thermoplastic resin may be done by heating the belt, such as with an oven or other mechanism that creates a heated and/or dehydrated environment for the resin to cure on the fabric carcass 12. In the illustrated embodiment, an oven tunnel 48 with infrared heaters 50 is provided after the doctor blade 30 to heat the conveyor belt to a preferred curing temperature, such as at least about 100° C. The temperature provided by the infrared heaters 50 is configured to be less than the melting point of the fabric carcass 12, such as about 150° C., or any other temperature that would otherwise compromise the structural integrity of the fabric carcass 12. It is also contemplated that other convention heating ovens may be used or, in the case of a thermosetting resin, ovens may not be necessary. The heat applied in the illustrated embodiment is generated by infrared waves that correspond with the infrared absorption characteristics of the polymer resin. Upon application of the heat, the resin viscosity initially drops and then begins to increase as the chemical reactions increase the average length and the degree of cross-linking between the constituent oligomers, ultimately resulting in gelation, adhesion, and curing of the resin to the fabric carcass 12.

Figure 8:
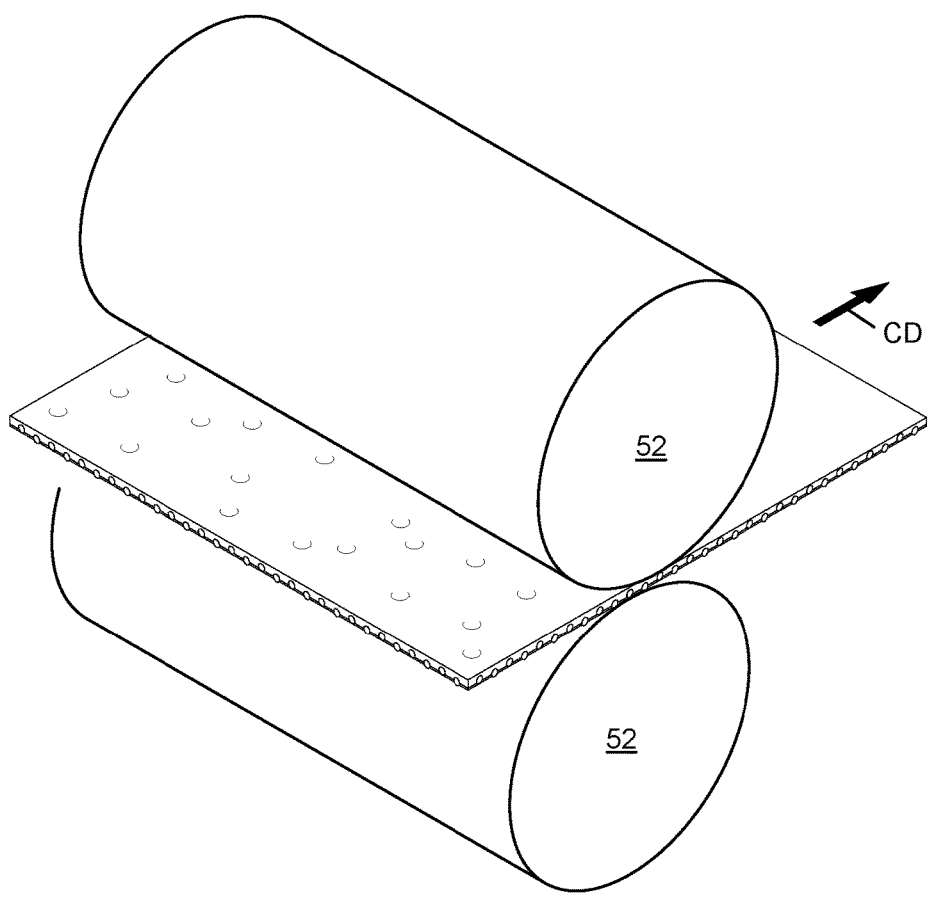
FIG. 8 is a perspective view of a roller set compressing and finishing the polymer resin on an exterior side of the conveyor belt, according to one embodiment.
Figure 8A:
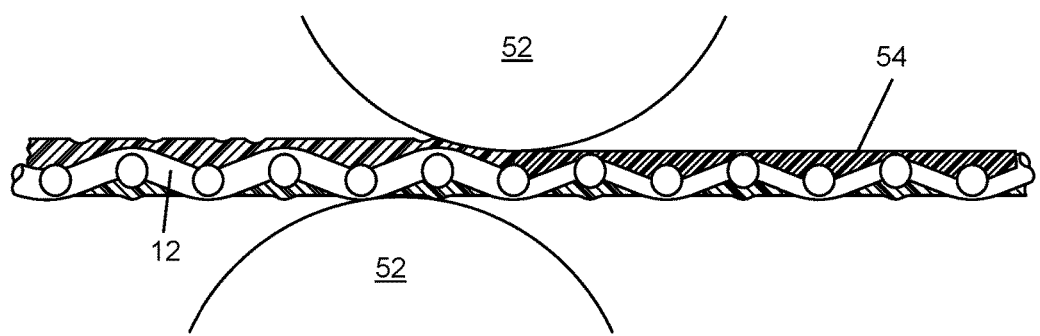
FIG. 8A is a cross-sectional view of the conveyor belt shown in FIG. 8.

After the conveyor belt passes through the oven tunnel 48, the partially cured resin on the fabric carcass 12 may have a dimpled or otherwise uneven surface. The belt then may passes through a series of compression rollers 52 (FIGS. 8-8A) that compresses the resin into the fabric carcass 12, remove trapped air, and further provide a smooth and flat finished surface 54. The conveyor belt 10 may receive multiple layers of the first polymer resin 16 by repeating the steps shown in FIGS. 5-8A, until the desired gauge thickness of the first polymer resin 16 is achieved. Each additional layer of the first polymer resin 16 will adhere and cure into the previous layer and the fabric carcass upon passing the belt thought the tunnel oven 48 and the compression rollers 52. In instances of thin layers that have few irregularities from the tunnel oven 48, the compression rollers may not be necessary, since the reinforcing layer of the first polymer resin does not form the outer exterior surface 20 of the finished conveyor belt 10 (FIG. 9) that interfaces with objects that are conveyed in operation of a conveyor system.

Figure 9:
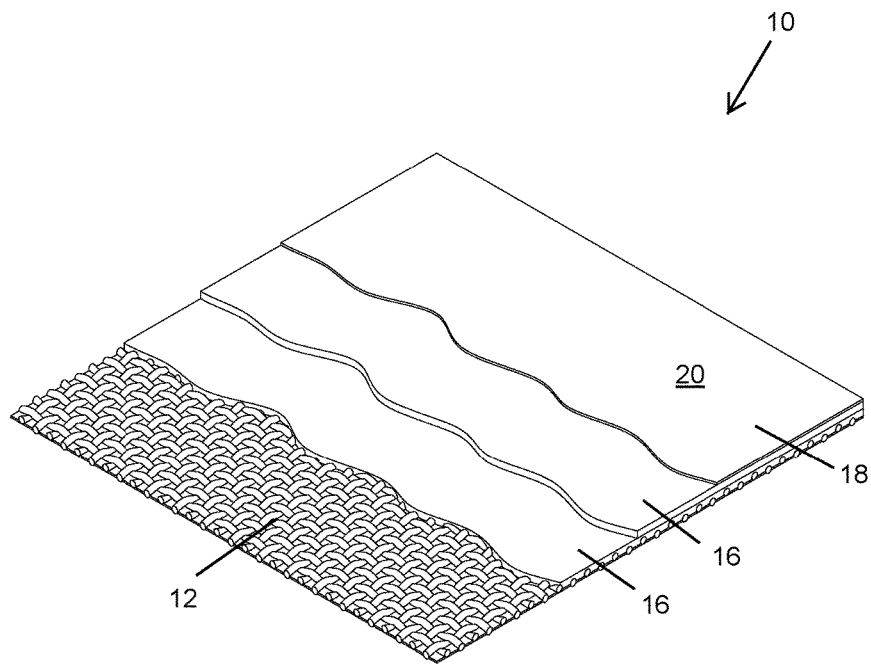
FIG. 9 is a perspective view of the conveyor belt with a cutaway view of different layers of polymer resin, including an exterior layer and a reinforcing layer over the impregnated fabric carcass, according to one embodiment.
Figure 9A:
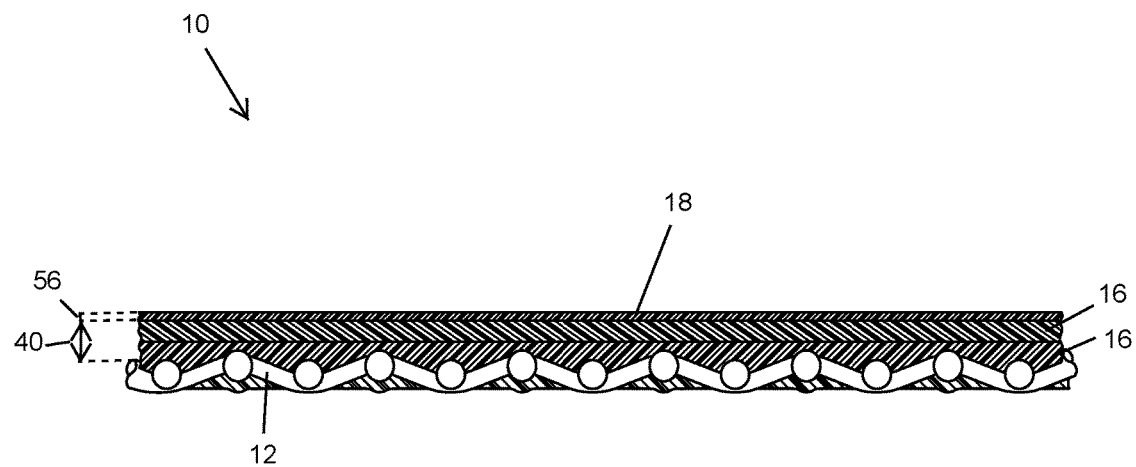
FIG. 9A is a cross-sectional view of the conveyor belt shown in FIG. 9.

As depicted in FIGS. 9-9A, the illustrated embodiment of the conveyor belt 10 includes multiple layers, including a finishing layer 56 of a second polymer resin 18 that includes polyester over the outer surface 54 of the first layer. The polyester resin 18 may be formed with granulated pellets mixed with a plasticizer and applied to the layer of the first polymer resin in a substantially identical manner as described above with reference to application of the first polymer layer having PVC and plasticizer additive. It is also contemplated that the polyester layer may be extruded, laminated, or applied in another conceivable manner to the outer surface 54 of the first polymer resin 16. Furthermore, it is conceivable that the PVC and/or polyester layers may in any combination be extruded, laminated, or applied in another conceivable manner to the outer surface 54 of the first polymer resin 16. In the case of applying the second polymer resin 18 in a liquid form, the layer may be leveled and spread the with a doctor blade 30 to regulate a second gauge thickness 56 of the second layer and to define the exterior surface 20 of the conveyor belt 10. Again, heat may be applied with a tunnel oven 48 to cure and adhere the second polymer resin 18 to the cured first layer 40 of the first polymer resin 16, and the second polymer resin may be compressed to further adhere to the first polymer resin by compression rollers, similarly providing a smooth and consistent exterior surface. Should it be desired, it is also conceivable that the final exterior surface 20 may be modified to have ridges, grooves, or other embossment, by the final compression roller which may include such embossing indicia on the outer circumferential surface thereof. Similar to the first polymer resin 16, the second polymer resin 18 may be applied in multiple layers to add to the overall thickness of the polyester layer. The exterior polymer 18 provides greater compressive resiliency than the reinforcing polymer 16, such that the exterior polymer is configured for interfacing with a die press of a stamping station that compresses and bites down into the exterior polymer (i.e. the polyester substrate). Also, the first polymer resin layer or layers may have an overall thickness that is greater than the second thickness of the second defined layer of the exterior polymer, such that conveyor belt is configured to transport sharp rigid objects, such as recyclable material.

Changes and modifications in the specifically described embodiments may be carried out without departing from the principles of the present invention, which is intended to be limited only by the scope of the appended claims as interpreted according to the principles of patent law.

The invention claimed is:

1. A conveyor belt, comprising:
   a fabric carcass having woven filaments in longitudinal and lateral directions, wherein the fabric carcass of the conveyor belt is configured to convey objects in the longitudinal direction to define a conveyance direction, and wherein at least some of the woven filaments arranged in the longitudinal direction are configured to withstand tensile stresses put on the conveyor belt;
   a reinforcing polymer comprising polyvinyl chloride disposed in a first defined layer over an exterior side of the fabric carcass to form a first thickness; and
   an exterior polymer comprising polyester disposed in a second defined layer over and fused to the first defined layer to form a second thickness, wherein the second defined layer of the exterior polymer provides greater compressive resiliency than the first defined layer of the reinforcing polymer.

2. The conveyor belt of claim 1, wherein the first thickness of the first defined layer of reinforcing polymer is greater than the second thickness of the second defined layer of the exterior polymer, such that the exterior polymer defines an exterior surface of the conveyor belt for interfacing with objects to be conveyed.

3. The conveyor belt of claim 1, wherein the fabric carcass is impregnated with the reinforcing polymer when the fabric carcass is placed under longitudinal tension configured to be similar to tension applied when operating a conveyor system, and wherein an interior side of the fabric carcass has portions of the woven filaments that are exposed to provide friction against a roller of the conveyor system.

4. The conveyor belt of claim 1, wherein the exterior polymer comprises a thermoplastic elastomer.

5. The conveyor belt of claim 1, wherein the fabric carcass includes a single woven structure comprising polyester filaments with a melting point greater than the reinforcing polymer and the exterior polymer.

6. The conveyor belt of claim 1, wherein the reinforcing polymer includes a plasticizer additive that improves the flexibility and durability of the polyvinyl chloride.

7. A conveyor belt, comprising:
   a fabric carcass having filaments disposed longitudinally in a conveyance direction, wherein at least some of the filaments that are arranged longitudinally in the conveyance direction are configured to withstand tensile stresses put on the conveyor belt;
   a polyvinyl chloride resin impregnated in the fabric carcass and disposed over an exterior side of the fabric carcass to cure with a first layer thickness; and
   a polyester resin disposed over the cured layer of polyvinyl chloride resin to form a second layer thickness and define an exterior surface that is configured for interfacing with a conveyed object or a die press.

8. The conveyor belt of claim 7, wherein the first layer thickness of the polyvinyl chloride resin is greater than the second layer thickness of the polyester resin.

9. The conveyor belt of claim 8, wherein the first layer thickness of the polyvinyl chloride resin provides less compressive resiliency than the second layer thickness of the polyester resin.

10. The conveyor belt of claim 7, wherein an interior side of the fabric carcass has portions of the woven filaments exposed to provide friction against a roller of a conveyor system.

11. The conveyor belt of claim 7, wherein the fabric carcass includes a woven structure comprising filaments with a melting point greater than the polyvinyl chloride resin and the polyester resin, and wherein, when the polyvinyl chloride resin is disposed over the fabric carcass, the fabric carcass is placed under longitudinal tension that is configured to be similar to tension applied when operating a conveyor system.

12. The conveyor belt of claim 7, wherein the polyvinyl chloride resin includes a plasticizer additive that improves the flexibility and durability of the first layer thickness, and wherein the second layer thickness is greater than the first layer thickness.

13. A method for forming a conveyor belt, said method comprising:
   providing a fabric belt carcass that comprises filaments arranged longitudinally in a conveyance direction that are configured to withstand tensile stresses put on the conveyor belt;
   applying a reinforcing polymer comprising polyvinyl chloride over an exterior side of the fabric belt carcass; and
   applying an exterior polymer comprising polyester over the reinforcing polymer to define an exterior surface of the conveyor belt.

14. The method of claim 13, further comprising:
   before applying the reinforcing polymer over the exterior side of the fabric belt carcass, impregnating the fabric belt carcass with a polyvinyl chloride resin to form a substantially impervious belt.

15. The method of claim 13, wherein the fabric belt carcass includes warp filaments woven in a longitudinal direction and weft filaments woven in a lateral direction, wherein the fabric belt carcass is placed under generally constant tension in the longitudinal direction when applying the reinforcing polymer, and wherein the generally constant tension in the longitudinal direction is applied in the conveyance direction at a similar tension to that applied to the conveyor belt when operating a conveyor system.

16. The method of claim 13, further comprising:

heating the reinforcing polymer to cure and adhere it to the fabric belt carcass, prior to applying the exterior polymer; and heating the exterior polymer to cure and adhere it to the cured reinforcing polymer.

17. The method of claim 16, wherein the heat applied to at least one of the reinforcing polymer and the exterior polymer is generated by infrared waves that correspond with absorption characteristics of the respective polymer.

18. The method of claim 13, wherein the reinforcing polymer comprises a liquid resin.

19. The method of claim 18, further comprising:

leveling the liquid resin of the reinforcing polymer with a doctor blade to regulate a gauge thickness of an applied layer of the reinforcing polymer and to define an outer surface thereof.

20. The conveyor belt of claim 13, further comprising:

compressing the reinforcing polymer and fabric belt carcass between two rollers; and compressing the exterior polymer, reinforcing polymer, and fabric belt carcass between two rollers to provide a smooth and consistent exterior surface.

* * * * *